(12) United States Patent
Sato et al.

(10) Patent No.: US 6,690,632 B1
(45) Date of Patent: Feb. 10, 2004

(54) TILT SERVO APPARATUS AND CONTROL METHOD THEREOF

(75) Inventors: Takeshi Sato, Kawagoe (JP); Motoi Kimura, Kawagoe (JP); Alex Bradshaw, Kawagoe (JP); Norio Matsuda, Kawagoe (JP); Shinichi Naohara, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/548,263

(22) Filed: Apr. 12, 2000

(30) Foreign Application Priority Data

Apr. 14, 1999 (JP) .......................................... 11-106836

(51) Int. Cl.7 ................................................ G11B 3/90
(52) U.S. Cl. ................................ 369/53.19; 369/112.02
(58) Field of Search .......................... 369/44.32, 53.18, 369/53.19, 53.31, 112.02

(56) References Cited

U.S. PATENT DOCUMENTS

| 5,610,886 A | * | 3/1997 | Hayashi et al. | .......... 369/44.29 |
| 5,886,496 A | * | 3/1999 | Furukawa et al. | ....... 369/53.19 |
| 6,075,760 A | * | 6/2000 | Tsutsui et al. | .......... 369/44.27 |
| 6,078,556 A | * | 6/2000 | Furukawa et al. | ....... 369/53.19 |
| 6,137,754 A | * | 10/2000 | Furukawa et al. | ....... 369/44.32 |
| 6,151,154 A | * | 11/2000 | Ogasawara et al. | ......... 359/279 |
| 6,160,772 A | * | 12/2000 | Muramatsu | .............. 369/44.32 |
| 6,192,010 B1 | * | 2/2001 | Wang et al. | ............. 369/53.11 |

* cited by examiner

*Primary Examiner*—Paul W. Huber
(74) *Attorney, Agent, or Firm*—Morgan, Lewis & Bockius LLP

(57) ABSTRACT

A tilt servo apparatus which can correct a tilt error at a high speed and with high precision irrespective of a magnitude of the tilt error even if a response speed of a liquid crystal device decreases is provided. An amount of change and an increase/decrease of a signal intensity are detected by changing a correction value of a tilt error correcting arrangement by a first correction width, and a correction width of the correction value and a correcting direction are determined on the basis of the detection result. When the amount of change of the signal intensity is smaller than a predetermined amount of change, the correction width is changed to a second correction width which is smaller than a first correction width. When it is larger than the predetermined amount of change, the correction width is changed to a third correction width larger than the first correction width. The correction width is also determined in accordance with a change in environmental temperature.

16 Claims, 14 Drawing Sheets

TILT SERVO APPARATUS AND CONTROL METHOD THEREOF

BACKGROUND OF THE INVENTION

1. Field of the Invention

The invention relates to a tilt servo apparatus and a control method for the apparatus and, more particularly, to a tilt servo apparatus which is used in a recording/reproducing apparatus of an optical disc and a control method for such an apparatus.

2. Description of the Related Art

In a recording/reproducing apparatus of an optical disc such as CD (Compact Disc), DVD (Digital Versatile Disc), or the like, a deviation occurs between an optical axis of a laser beam irradiated from an optical pickup and a direction normal to the optical disc at the beam irradiating position due to a warp or the like of the optical disc. An angle of such deviation is called a tilt angle, and occurs mainly in the direction of radius of the optical disc (hereinafter, referred to as "radial direction"), and which causes a coma-aberration or the like of an optical system. When the tilt angle occurs, signal deterioration such as crosstalk to an adjacent track, jitter, or the like appears which exerts an adverse influence on the reproducing quality of the optical disc. Since it is necessary to shorten a wavelength of the laser beam and to increase a numerical aperture NA of an objective lens in order to reduce a spot diameter of the laser beam, particularly, in such case as to perform a high density recording such as in a DVD system, a margin for the tilt angle decreases. Thus, the reproducing quality is greatly deteriorated even if the optical disc is slightly inclined. To correct an aberration due to the tilt angle during the reproduction of the optical disc, therefore, a disc player is generally provided with a tilt servo mechanism for correcting the tilt error on the basis of a detection signal intensity of the reflected laser beam.

It is, however, required that the tilt servo mechanism operates at a high speed and, particularly, in a reproducing apparatus which handles an optical disc of a high density recording, a tilt servo mechanism is necessary which performs a high speed operation. In a tilt servo apparatus using a liquid crystal device in order to correct an aberration, there is such a problem that a response speed of the liquid crystal decreases due to a reduction of an environmental temperature and the operation of the tilt servo becomes slow.

OBJECTS AND SUMMARY OF THE INVENTION

The present invention is made in consideration of the problems and it is an object of the invention to provide a tilt servo apparatus which operates at a high speed and with high precision irrespective of a magnitude of a tilt error and a change in environmental temperature.

A tilt servo apparatus according to the present invention comprises: photodetecting means for detecting a reflected light beam of a laser beam irradiated to an optical recording medium, tilt error correcting means for correcting a tilt error occurring due to a tilt angle which is formed between an optical axis of the laser beam and a direction normal to the optical recording medium at the laser beam irradiating position, control means for controlling the tilt error correcting means on the basis of a detection signal intensity of the photodetecting means, correction value changing means for changing a correction value of the tilt error correcting means by a first correction width; comparing means for comparing an amount of change of the detection signal intensity when the correction value is changed by the first correction width with a predetermined amount of change; and correction width changing means for changing the first correction width on the basis of the comparison result of the comparing means.

According to another aspect of the present invention, if it is determined by the comparing means that the amount of change is smaller than the predetermined amount of change, the correction width changing means changes the first correction width to a second correction width smaller than the first correction width.

According to further aspect of the present invention, the comparing means also discriminates a reduction of the detection signal intensity when the correction value is changed, and when the reduction of the detection signal intensity is determined, the correction width changing means reverses an increasing/decreasing direction of the correction value and calculates the correction width.

According to further another aspect of the present invention, the tilt error correcting means is a liquid crystal device for aberration correction arranged on the optical axis of the laser beam, and the control signal of the control means is a driving signal of the liquid crystal device.

According to further aspect of the present invention, the apparatus further comprises temperature detecting means for detecting a temperature of an environment where the liquid crystal device is arranged, wherein the correction width is determined on the basis of the detected environmental temperature.

According to further another aspect of the present invention, the apparatus further comprises storing means for storing the correction value in which the amount of change is smaller than a predetermined threshold value as an optimum value of the tilt error correction, wherein the control means uses the stored optimum value as an initial value of the correction value of the tilt error correcting means.

According to further aspect of the present invention, the apparatus further comprises level changing means for changing a level of the detection signal intensity so that the detection signal intensity does not exceed a predetermined upper limit value.

A tilt servo apparatus according to the present invention comprises: photodetecting means for detecting a reflected light beam of a laser beam irradiated to an optical recording medium, tilt error correcting means for correcting a tilt error occurring due to a tilt angle which is formed between an optical axis of the laser beam and a direction normal to the optical recording medium at the laser beam irradiating position, control means for controlling the tilt error correcting means on the basis of a detection signal intensity of the photodetecting means, discriminating means for discriminating an increase/decrease and an amount of change of the detection signal intensity when a correction value of the tilt error correcting means is changed by a predetermined value; calculating means for calculating a correction width on the basis of a discrimination result of the discriminating means; and determining means for determining a plurality of correction values which are different from one another by the calculated correction width. The control means controls the tilt error correcting means so as to obtain a correction value in which the detection signal intensity becomes the maximum among the plurality of correction values.

DETAILED DESCRIPTION OF THE PREFERRED EMBODIMENTS

Figure 1:
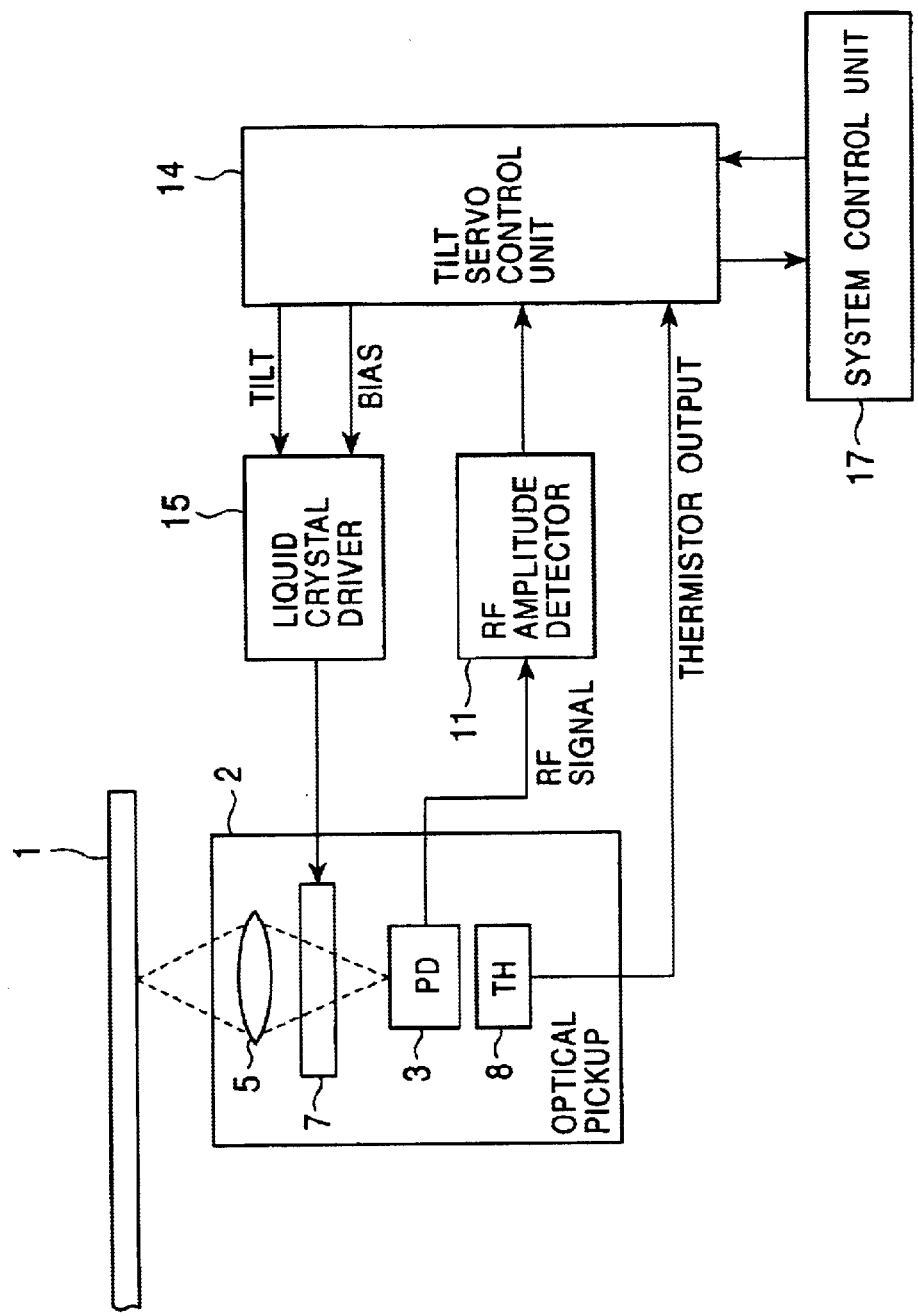
FIG. 1 is a block diagram schematically showing a configuration of a tilt servo apparatus of an optical disc player according to the present invention.

Embodiments of the present invention will now be described in detail with reference to the drawings. In the drawings which will be explained hereinbelow, substantially similar or equivalent portions are designated by the same reference numerals.

First Embodiment

FIG. 1 is a diagram schematically showing a configuration of a tilt servo apparatus of an optical disc player according to the first embodiment of the present invention. The apparatus includes: an optical disc 1; an optical pickup 2; an RF amplitude detector 11; a tilt servo control unit 14; a liquid crystal driving circuit 15; and a system control unit 17. The optical pickup 2 has a photodetector 3, an objective lens 5, a liquid crystal device 7, and a thermistor 8.

A laser beam irradiated from a laser beam source (not shown) in the optical pickup 2 is reflected by the optical disc 1. The reflected light beam is detected by the photodetector 3. The detected RF signal is sent to the RF amplitude detector 11. The liquid crystal device 7 is arranged on an optical axis of the laser beam in the optical pickup 2 and an aberration caused in the optical system can be corrected. The operation of the liquid crystal device 7 will be described later. The RF amplitude detector 11 detects an envelope of the received RF signal and transmits the detected RF envelope signal (hereinafter, simply referred to as RF amplitude signal) to the tilt servo control unit 14. An output indicating an environmental temperature of the optical pickup 2 is supplied from the thermistor 8 to the tilt servo control unit 14. On the basis of the RF amplitude signal and the detected environmental temperature, the tilt servo control unit 14 transmits a data control signal for correcting a tilt error, i.e., a tilt control signal and a bias control signal, to the liquid crystal driving circuit 15. The liquid crystal device 7, consequently, operates to vary a phase difference of the light beam passing through the liquid crystal device 7 and serves as tilt error correcting means by correcting the aberration. The system control unit 17 controls the tilt servo control unit 14 so as to perform an optimum tilt servo-control. The tilt servo control unit 14 and the system control unit 17 serve as tilt-error correction control means. A memory (not shown) including ROM and RAM is provided for the tilt servo control unit 14 and the system control unit 17.

The correcting operation of the aberration of the liquid crystal device 7 will now be described.

First, when the disc is inclined with respect to the optical axis of the objective lens 5, a wave front aberration occurs and the light spot formed on the disc deteriorates. Most of the wave front aberration is a coma aberration. A distribution curve of the wave front aberration on the pupil of the objective lens 5 hardly changes in dependence on the tilt angle. In a small tilt angle range of about 1°, the wave front aberration amount is almost proportional to the tilt angle. A dividing pattern of the liquid crystal device 7 is determined on the basis of, for example, the distribution curve. By controlling the individual driving voltage of the plurality of the divided regions, the phase difference of the light beam passing through each divided region can be individually changed, so that the aberration occurring due to the tilt can be corrected. A driving amount to be applied to each divided region of the liquid crystal device 7 has been stored in the ROM of the memory 14 in correspondence to a tilt correction amount. Since phase characteristics and response characteristics of the liquid crystal change due to the temperature, a liquid-crystal driving amount for phase correction corresponding to the tilt correction amount also changes. Data for the temperature fluctuation, therefore, is also stored in the ROM. The optimum phase correction control is made on the basis of the aforementioned data.

The tilt error correction using a variable-step mountain-climbing control method (hereinafter, simply referred to as variable step method) in the embodiment will now be described in detail with reference to the flowcharts shown in FIGS. 2 and 3 and a diagram of the operation of the variable step method shown in FIG. 4. In FIG. 4, an axis of abscissa indicates a tilt angle wherein it is equal to "0" when an angle that is formed by the optical axis of the laser beam and the optical disc surface at the beam irradiating position is a right angle, the direction of the tilt angle occurring in one radial direction from this state is set to a positive direction, and the direction of the tilt angle occurring in the other radial direction is set to a negative direction.

Figure 2:
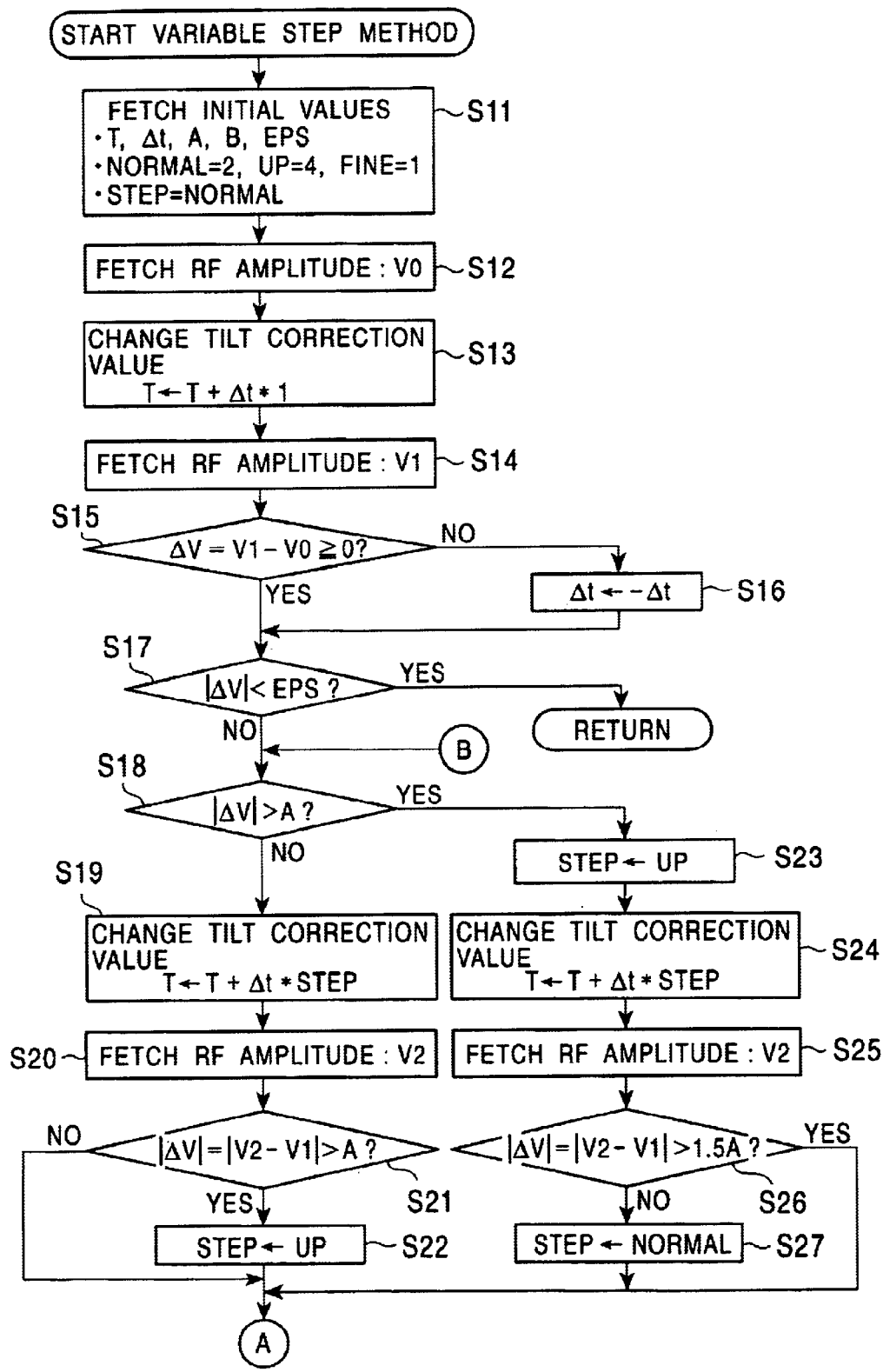
FIG. 2 is a flowchart showing a procedure for a variable step control method according to the first embodiment of the present invention.
Figure 3:
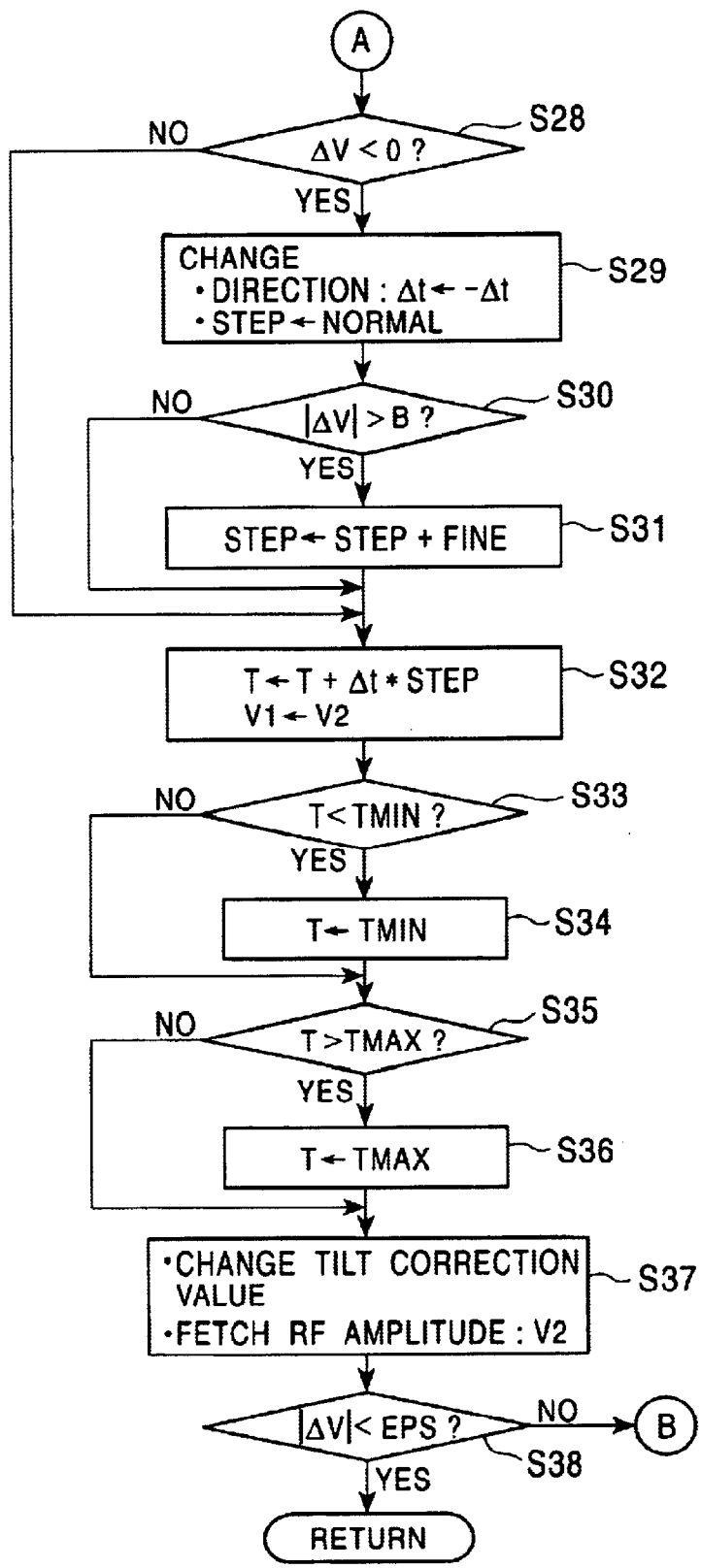
FIG. 3 is a flowchart showing the procedure for the variable step method according to the first embodiment of the present invention.
Figure 4:
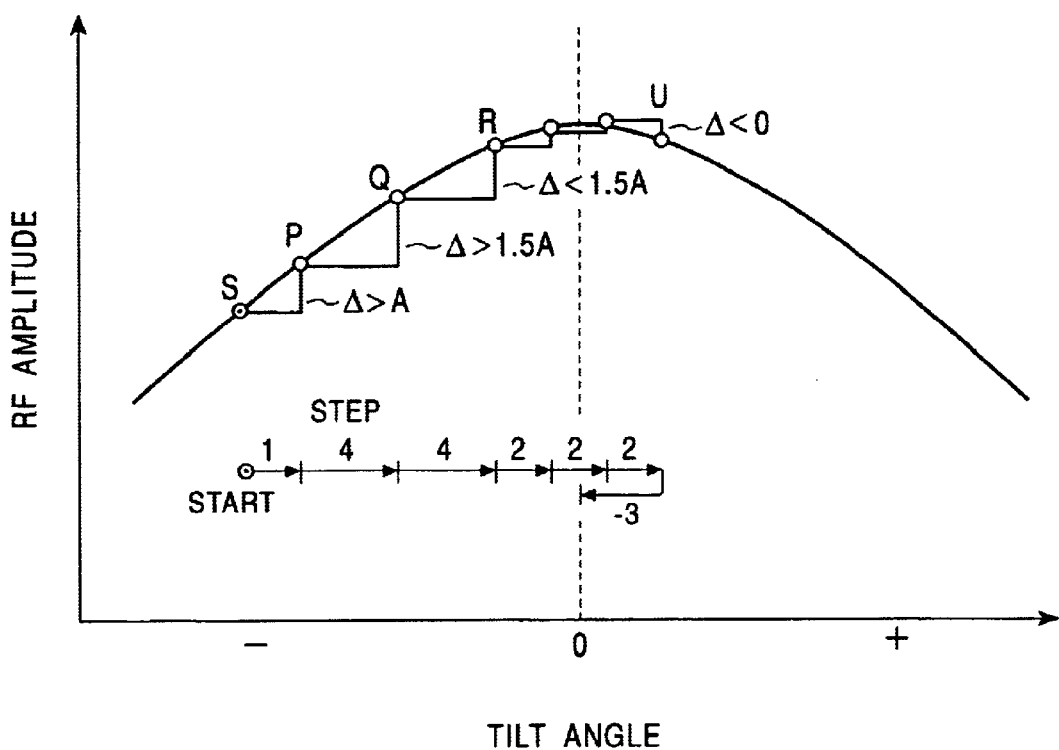
FIG. 4 is a diagram for explaining the operation of a variable step method according to the first embodiment of the present invention.

The operation shown in the flowcharts of FIGS. 2 and 3 is executed by, for example, an interrupting process by the system control unit 17 during the recording or reproduction of the optical disc 1.

First, initial set values such as parameters (T, Δt, NORMAL, UP, etc.) regarding the tilt correction amount which are used in the control routine, various identification levels (A, B, EPS, etc.), and the like are fetched (step S11). The set values are fetched from a memory or passed as arguments when the system control unit 17 calls the control routine. Although each of the set values will be explained later, the system control unit 17 controls so that the values corresponding to the temperature characteristics of the liquid crystal are used.

An RF envelope amplitude (hereinafter, simply referred to as RF amplitude) (V0) is subsequently fetched (step S12). The tilt correction value is increased from a present value T (point S in FIG. 4) by an amount of Δt (=Δt×1) (step S13, point P in FIG. 4). Here, Δt denotes a change unit of the tilt correction. In the variable step method, the tilt correction value is changed by an amount that is integer times as large as Δt and the tilt error correction is executed. An integer parameter to be multiplied to Δt is shown by "STEP" hereinbelow, so that an increase amount of the tilt correction value at a time is expressed by Δt×STEP. After the tilt correction value is changed, an RF amplitude (V1) is fetched (step S14). Whether the increase amount (ΔV) is equal to or larger than "0" or not is discriminated (step S15). When ΔV is less than "0", since this means that the tilt angle is in the direction so as to be deviated from a peak of the RF amplitude curve shown in FIG. 4 (i.e., the optimum tilt value), the correcting direction of the tilt correction value is reversed by replacing Δt with −Δt (step S16). When ΔV is equal to or larger than "0", the processing routine advances to step S17.

Subsequently, ΔV is compared with a predetermined small value (EPS) for discriminating whether it has reached the peak value or not (step S17). If the absolute value of ΔV is smaller than EPS, it is determined that it has reached the optimum value. Then, control returns to the main routine. When the absolute value of ΔV is equal to or larger than EPS, whether it exceeds a predetermined value (A) or not is further discriminated (step S18). If ΔV is less than A, STEP is replaced with "2" (NORMAL) and the tilt correction value is increased by 2Δt (step S19). After the tilt correction value is changed, an RF amplitude (V2) is fetched (step S20). Whether the absolute value of the increase amount (ΔV) of the RF amplitude at that time exceeds A or not is discriminated (step S21). When it exceeds A, STEP is replaced with "4" (UP) (step S22). When it is equal to or less than A, STEP is held to "2" (NORMAL) and step S28 follows. When ΔV exceeds A in step S18, STEP is replaced with "4" (UP) (step S23) and the tilt correction value is increased by 4Δt (step S24; point Q in FIG. 4). After the tilt correction value is changed, an RF amplitude (V2) is fetched (step S25). Whether the absolute value of the increase amount (ΔV) at this time exceeds 1.5 A or not is discriminated (step S26). When it is equal to or less than 1.5 A, STEP is replaced with "2" (NORMAL) (step S27; point R in FIG. 4). When it exceeds 1.5 A, STEP is held to "4" (UP) and step S28 follows. Further, whether ΔV is positive or negative, namely, whether the RF amplitude has increased or decreased is discriminated (step S28). When ΔV is equal to or larger than "0", step S32 follows. When ΔV is negative (decrease), Δt is replaced with −Δt, the correcting direction of the tilt correction value is reversed, and STEP is replaced with "2" (NORMAL) (step S29). Further, whether the absolute value of ΔV exceeds a predetermined value B or not is discriminated (step S30). When it exceeds B, a value "1" (FINE) for fine adjustment is added to STEP (step S31; point U in FIG. 4).

Subsequently, a tilt correction value to fetch the RF amplitude is obtained by adding a correction increase amount (Δt×STEP) corresponding to the present STEP value to the present tilt correction value T and the present RF amplitude (V2) is stored in V1 (step S32). Whether the next tilt correction value T is smaller than a predetermined minimum tilt correction value (TMIN) or not is discriminated (step S33). If it is smaller than TMIN, T is replaced with TMIN (step S34). Whether the tilt correction value T is larger than a predetermined maximum tilt correction value (TMAX) or not is discriminated (step S35). If it is larger than TMAX, T is replaced with TMAX (step S36). The tilt correction value is changed and the RF amplitude (V2) is fetched (step S37). The absolute value of ΔV is compared with EPS (step S38). When the absolute value of ΔV is equal to or larger than EPS, the processing routine is returned to step S18. The foregoing processes are repeated. When it is smaller than EPS, since it is determined that it has reached the peak value, control returns to the main routine.

According to the embodiment as described above, the tilt correction value is changed by an amount that is integer times as large as the predetermined correction amount (Δt) and the tilt error correction is executed by using the integer value as a parameter. Since the variable step method to determine the integer parameter value for changing the next tilt correction value is performed on the basis of the increase amount of the RF amplitude after the change of the tilt correction value, even if the tilt correction value at the start of the correction is far from the optimum correction value, the tilt correction value can be promptly settled to the optimum value. When it approaches the optimum value, the tilt correction value can be finely adjusted. Therefore, the tilt servo apparatus which can correct the tilt error at a high speed and with high precision can be realized. The optimum tilt-correction parameter and the parameters such as various identification levels are used in accordance with the environmental temperature as mentioned above. Therefore, even if the response speed of the liquid crystal decreases owing to the temperature change, the high speed and stable servo-control can be performed.

Although the embodiment has been described with respect to the example in the case where the tilt correction value is varied in the positive direction, the direction of the tilt correction value can be arbitrarily set to the positive or negative direction. Even in case of varying the tilt correction value in the negative direction in the above description, therefore, the invention can be similarly executed. The foregoing tilt-correction value or the parameter values regarding the identification levels or the like have been used for explanation. The values or the parameters may be set so that the tilt error correction is optimally performed.

Second Embodiment

The second embodiment of the present invention will be described hereinbelow. A configuration of a tilt servo apparatus of the embodiment is similar to that of the first embodiment.

A tilt error correction using the N-point control method (hereinafter, simply referred to as N-point method) in the embodiment will be described in detail with respect to the case of N=4 as an example with reference to a flowchart shown in FIG. 5 and FIGS. 6 to 9 for illustrating the operation of the N-point method.

Figure 5:
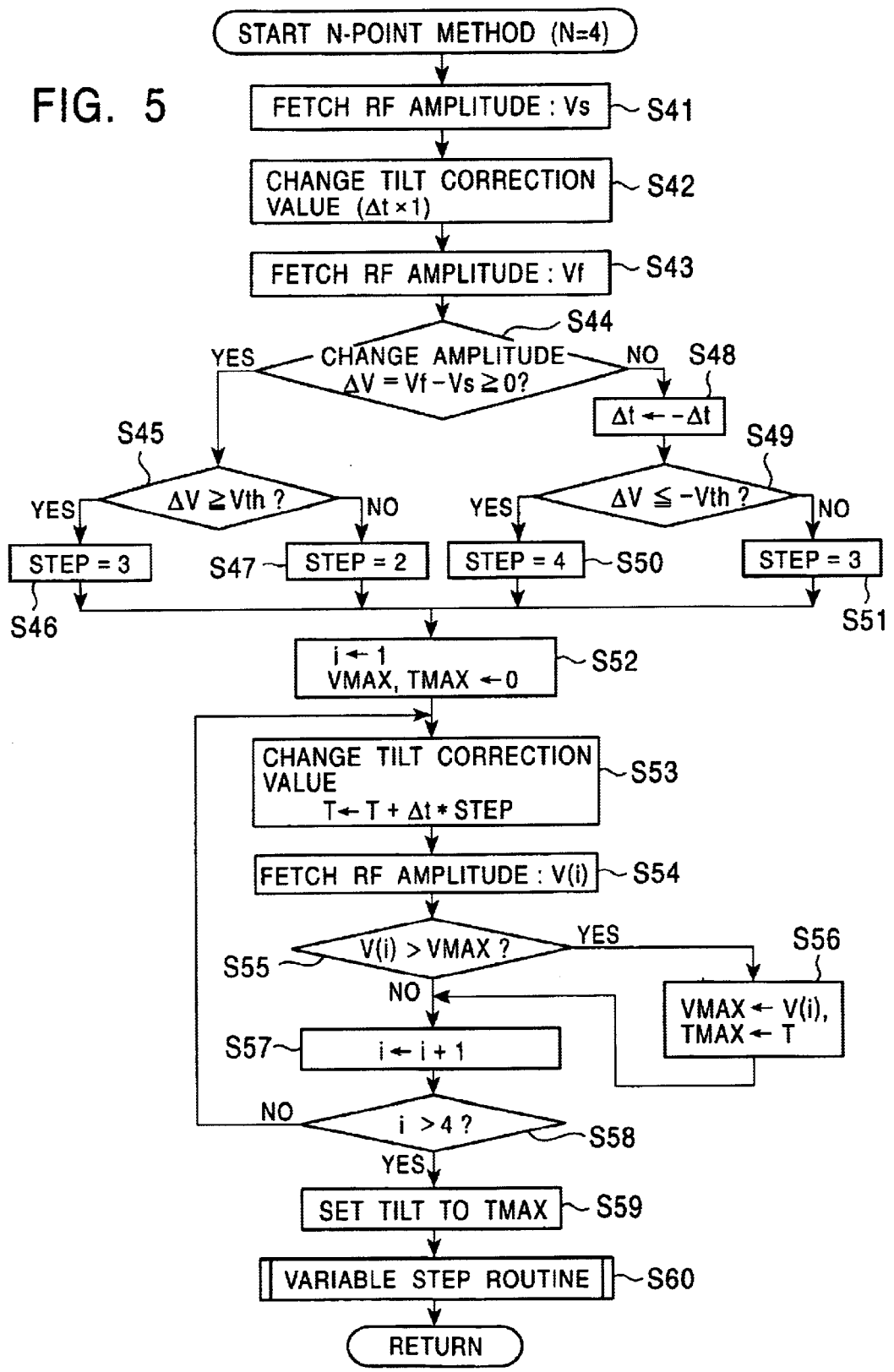
FIG. 5 is a flowchart showing a procedure for an N-point control method according to the second embodiment of the present invention.

The operation shown in the flowchart of FIG. 5 is executed, for example, during the recording or reproduction of the optical disc 1 by an interrupting process by the system control unit 17.

Figure 6:
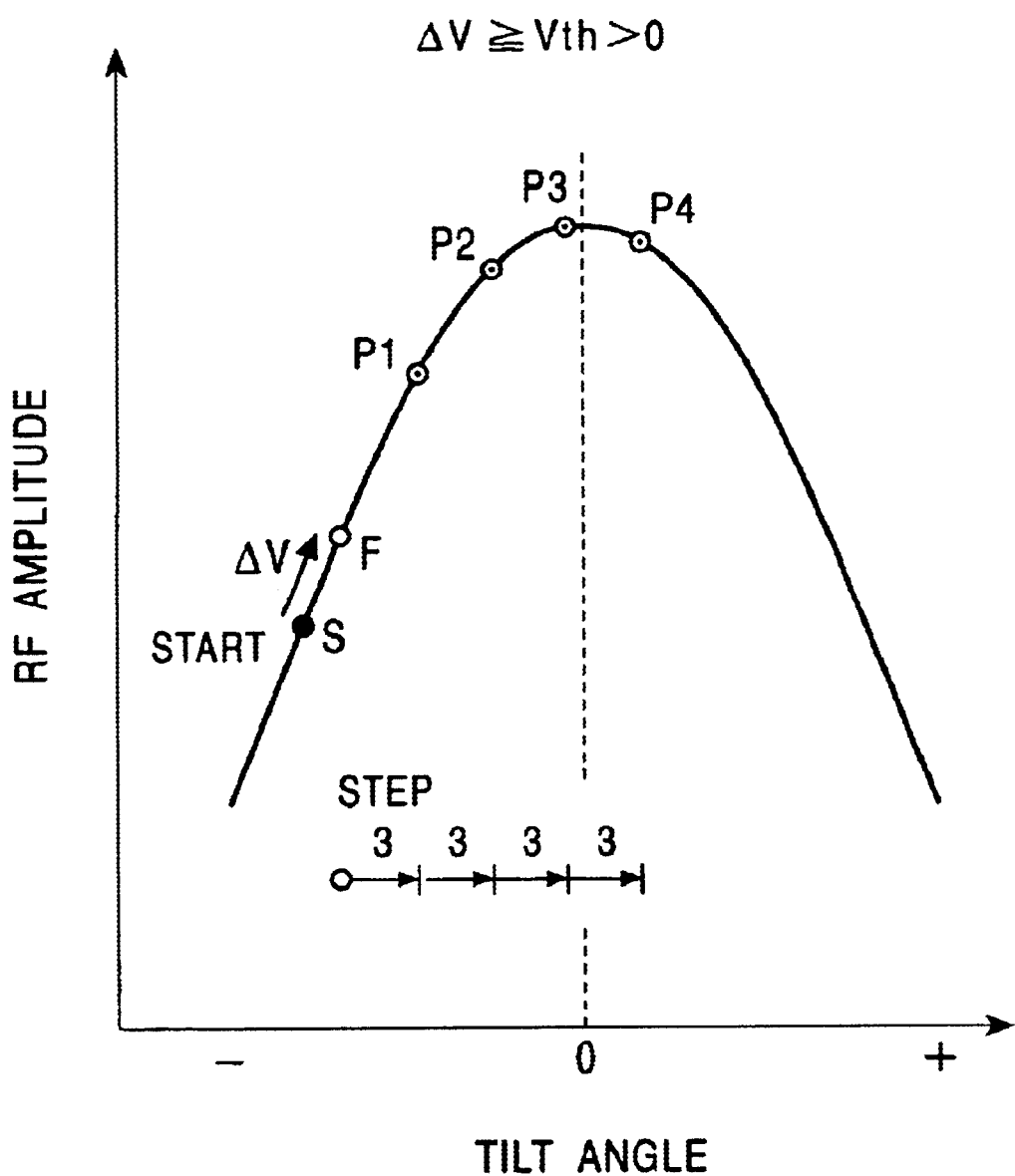
FIG. 6 is a diagram for explaining the operation of the N-point method according to the second embodiment of the present invention.
Figure 7:
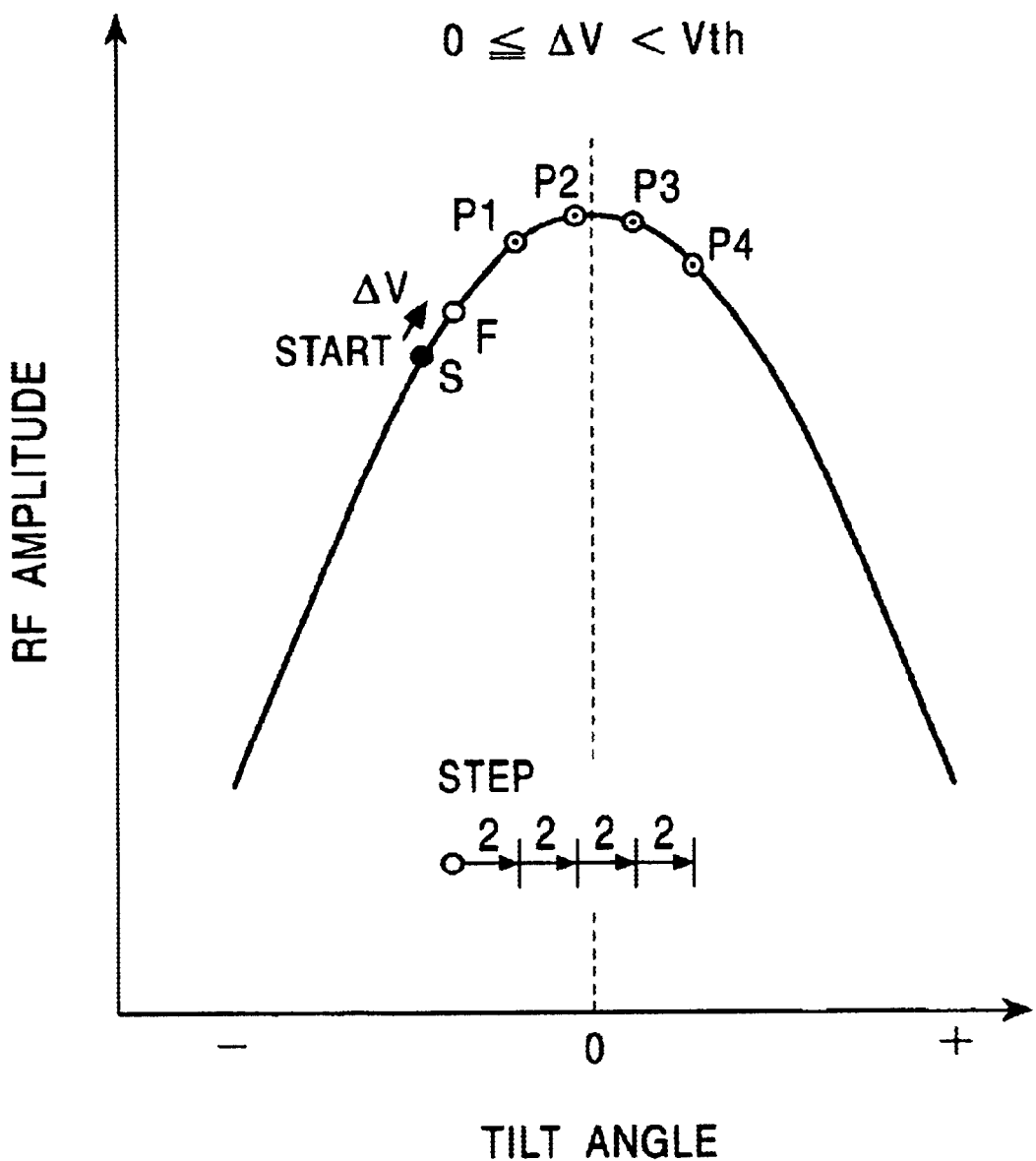
FIG. 7 is a diagram for explaining the operation of the N-point method according to the second embodiment of the present invention.
Figure 8:
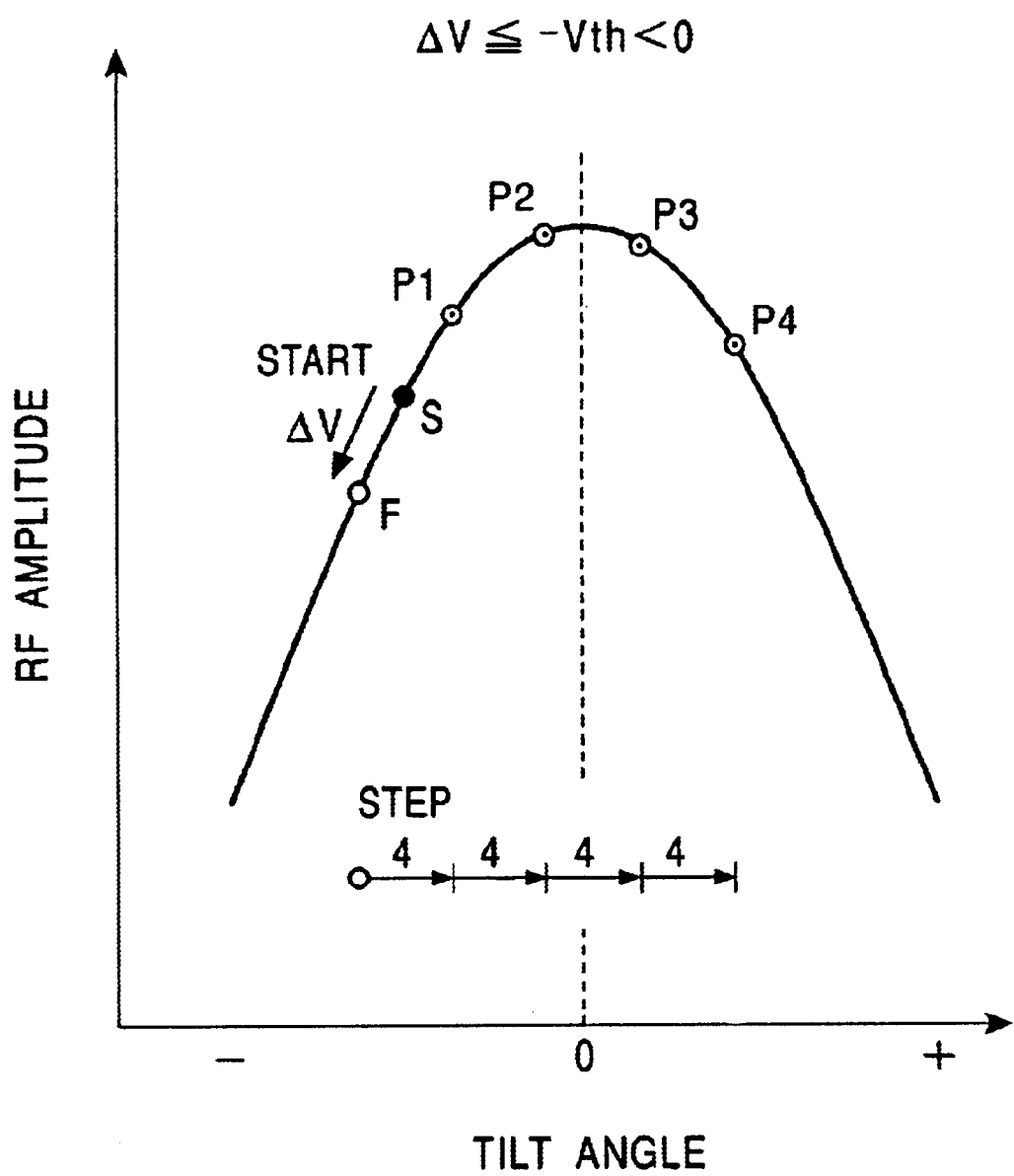
FIG. 8 is a diagram for explaining the operation of the N-point method according to the second embodiment of the present invention.
Figure 9:
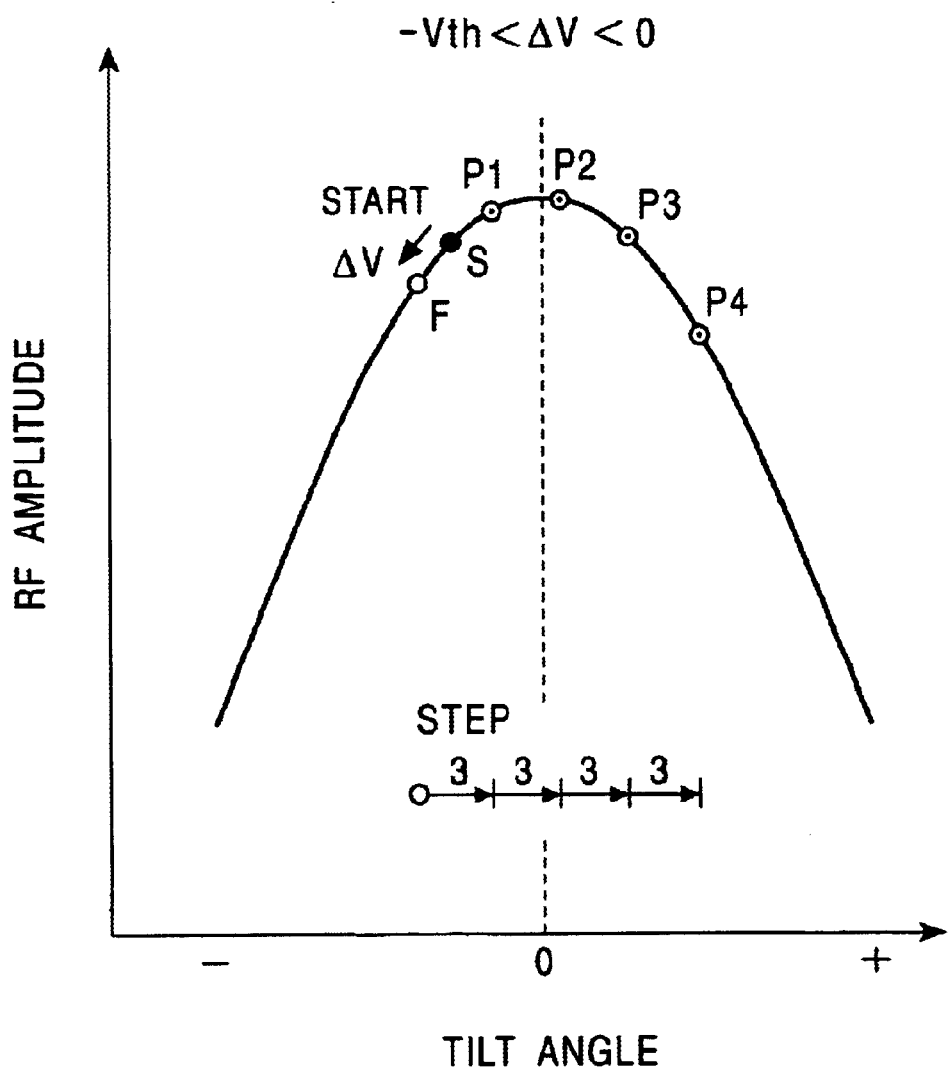
FIG. 9 is a diagram for explaining the operation of the N-point method according to the second embodiment of the present invention.

First, the RF amplitude (Vs) is fetched (step S41) and the tilt correction value is increased from the present value T (point S in FIGS. 6 to 9) by an amount of Δt (=Δt×1) (step S42; point F in FIGS. 6 to 9). In a manner similar to the case of the first embodiment, Δt denotes the change unit of the tilt correction value and an integer parameter to be multiplied to Δt is expressed by "STEP". After the tilt correction value is changed, the RF amplitude (Vf) is fetched (step S43) and whether the increase amount (ΔV=Vf−Vs) is equal to or larger than "0" or not is discriminated (step S44). When ΔV is equal to or larger than "0", as shown in FIG. 6 or 7, since it is determined that the tilt correction value has been changed in the direction of the peak of the RF amplitude curve (i.e., in the direction of the optimum tilt value), ΔV is compared with a predetermined value (Vth) (step S45). When ΔV is equal to or larger than Vth, the integer value parameter STEP to set a tilt correction value interval between four RF amplitude detecting points, which will be explained later, is set to "3" (step S46, FIG. 6). If ΔV is less than Vth, STEP is set to "2" (step S47, FIG. 7). When ΔV is less than "0" in step S44, since the tilt correction value is in the direction that is deviated from the peak of the RF amplitude curve as shown in FIG. 8 or 9, Δt is replaced with −Δt and the correcting direction of the tilt correction value is reversed (step S48). Subsequently, ΔV is compared with the predetermined value Vth (step S49). When ΔV is equal to or less than −Vth, namely, if the absolute value of ΔV is equal to or larger than Vth, the parameter STEP is set to "4" (step S50, FIG. 8). If the absolute value of ΔV is less than Vth, STEP is set to "3" (step S51, FIG. 9).

After completion of the setting of the parameter STEP as mentioned above, "i" is initialized to "1" in order to count the number of RF amplitude detecting points and the maximum value of the RF amplitude and VMAX and TMAX to store the tilt correction value at that time are initialized to "0" (step S52). Subsequently, the tilt correction value is increased from the present value T (point F in FIGS. 6 to 9) by an amount of (Δt×STEP) (step S53, point P1 in FIGS. 6 to 9). The RF amplitude V(1) in this tilt correction value is fetched (step S54). The fetched V(1) is compared with VMAX (step S55). If it is equal to or larger than VMAX, V(1) is set to VMAX and the tilt correction value T at this time is set to TMAX (step S56). Subsequently, a count value (i) is incremented by "1" (step S57). The count value (i) is compared with the number N (=4) of detecting points (step S58). Unless the fetching of the RF amplitude is completed with respect to all of the detecting points, the processing routine is returned to step S53 and the procedure up to step S55 is repeated. By the above processes, values V(1) to V(4) at four points (i.e., points P1, P2, P3, P4 in FIGS. 6 to 9) are obtained. After the fetching of the RF amplitude is completed with regard to all detecting points, the tilt correction value is set to TMAX (step S59). The RF amplitude maximum points obtained in this manner are the points P3, P2, P2, and P2 in FIGS. 6 through 9, respectively. After the above processes are finished, a variable step method routine is called and the tilt control using the variable step method is executed (step S60).

As described above, in the embodiment, the RF amplitude values at N (=4) points are detected at the tilt correction value interval that is integer times as large as the predetermined correction amount (Δt). In this case, the integer parameter is determined on the basis of the change in RF amplitude at the start point of the tilt servo and the tilt error correction is executed. That is, since the tilt correction value interval for detecting the RF amplitude is obtained in accordance with the inclination and direction of the RF amplitude curve at the start position of the tilt servo, a time that is required for fetching the data is also short and a converging speed in the variable step method can be raised. The tilt servo apparatus which operates at a high speed, therefore, can be realized. By optimizing the number N of the detecting points, the tilt correction value interval, and the like, the further high precision tilt error correction can be performed. Further, as mentioned above, since the optimum value for each parameter is used in accordance with an environmental temperature, the high speed and stable servo-control can be performed.

Although the embodiment has been described with respect to the case of varying the tilt correction value in the positive direction as an example. Tilt correction in the negative direction can also be similarly executed. The parameter values regarding the tilt correction value change, the identification level, and the like have been mentioned for explanation. The values may be set so that the tilt error correction is optimally performed.

Third Embodiment

Figure 10:
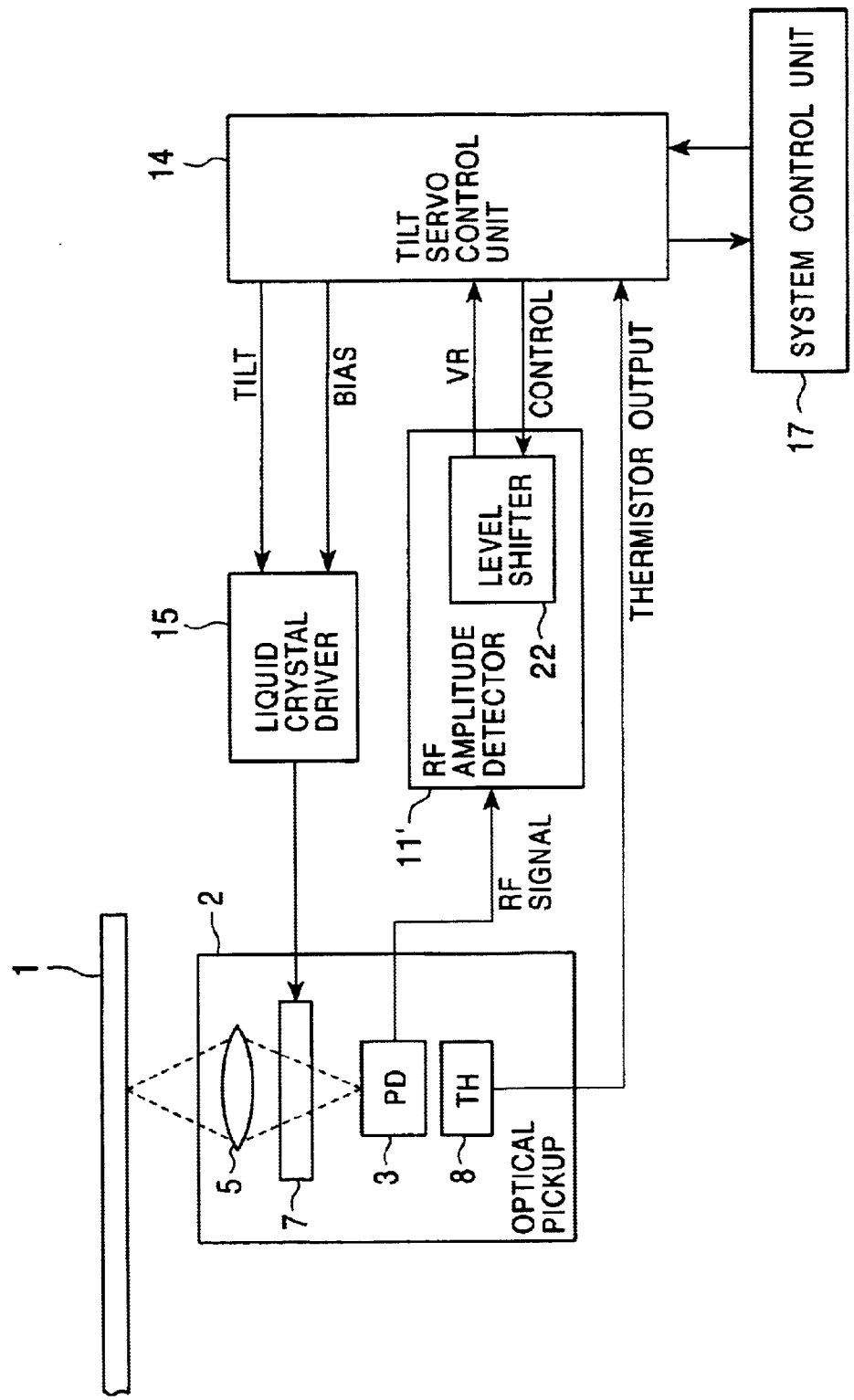
FIG. 10 is a block diagram schematically showing a configuration of a tilt servo apparatus of an optical disc player according to the third embodiment of the present invention.

FIG. 10 is a diagram schematically showing a configuration of a tilt servo apparatus of an optical disc player according to the third embodiment of the present invention. Although a fundamental configuration is similar to that of the first embodiment, the difference is that a level-shifting unit 22 is provided in an RF amplitude detector 11' in the third embodiment.

Figure 11:
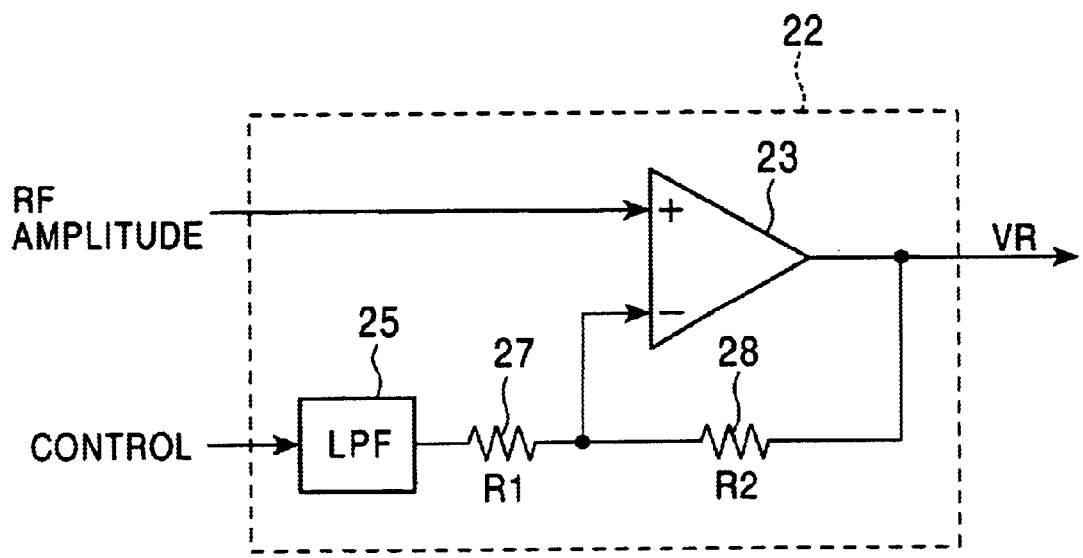
FIG. 11 is a block diagram showing an internal configuration of a level shifting unit according to the third embodiment of the present invention.

FIG. 11 shows an internal configuration of the level-shifting unit 22. The level-shifting unit 22 incledes an operational amplifier 23, a low pass filter (LPF) 25, and resistors 27 (R1) and 28 (R2). The level shifting unit 22 also has an RF amplitude input terminal, a PWM (Pulse Width Modulation) control signal input terminal from the tilt servo control unit 14, and a level shift signal output terminal.

The operation of the level-shifting unit 22 will now be described. An RF amplitude signal formed in the RF amplitude detector 11' by the envelope detection of the read RF signal is supplied to one end of the operational amplifier 23. The PWM control signal supplied from the tilt servo control unit 14 is integrated by the LPF 25 and supplied to the other end of the operational amplifier 23. An amplitude intensity signal VR whose level has been shifted in response to a PWM control signal is, therefore, transmitted from an output terminal of the operational amplifier 23 to the tilt servo control unit 14.

The tilt error correction using the level shift control in the embodiment will be described in detail with reference to flowcharts shown in FIGS. 12 and 13.

Figure 12:
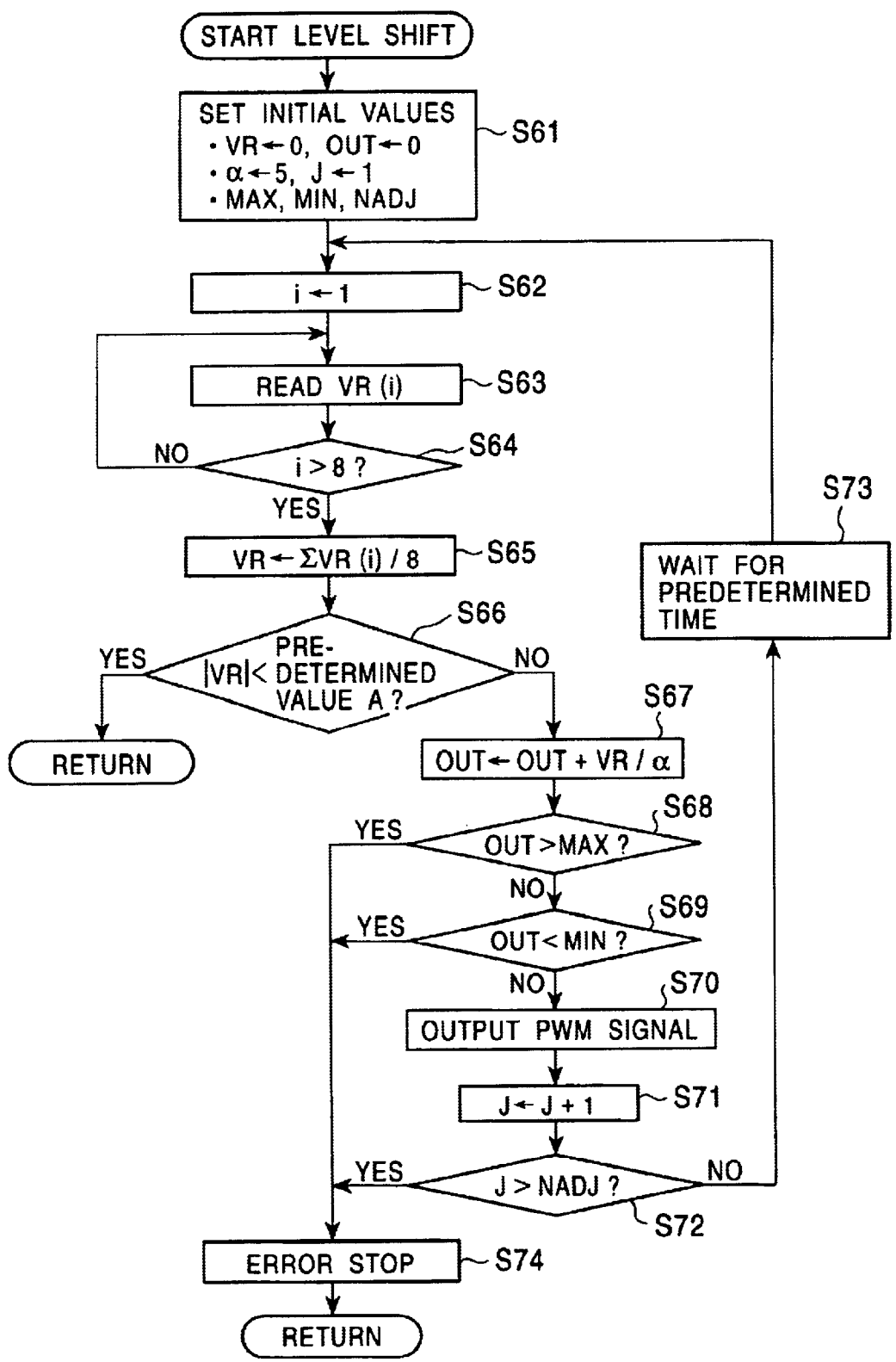
FIG. 12 is a flowchart showing a procedure for a level shift control method according to the third embodiment of the present invention.
Figure 13:
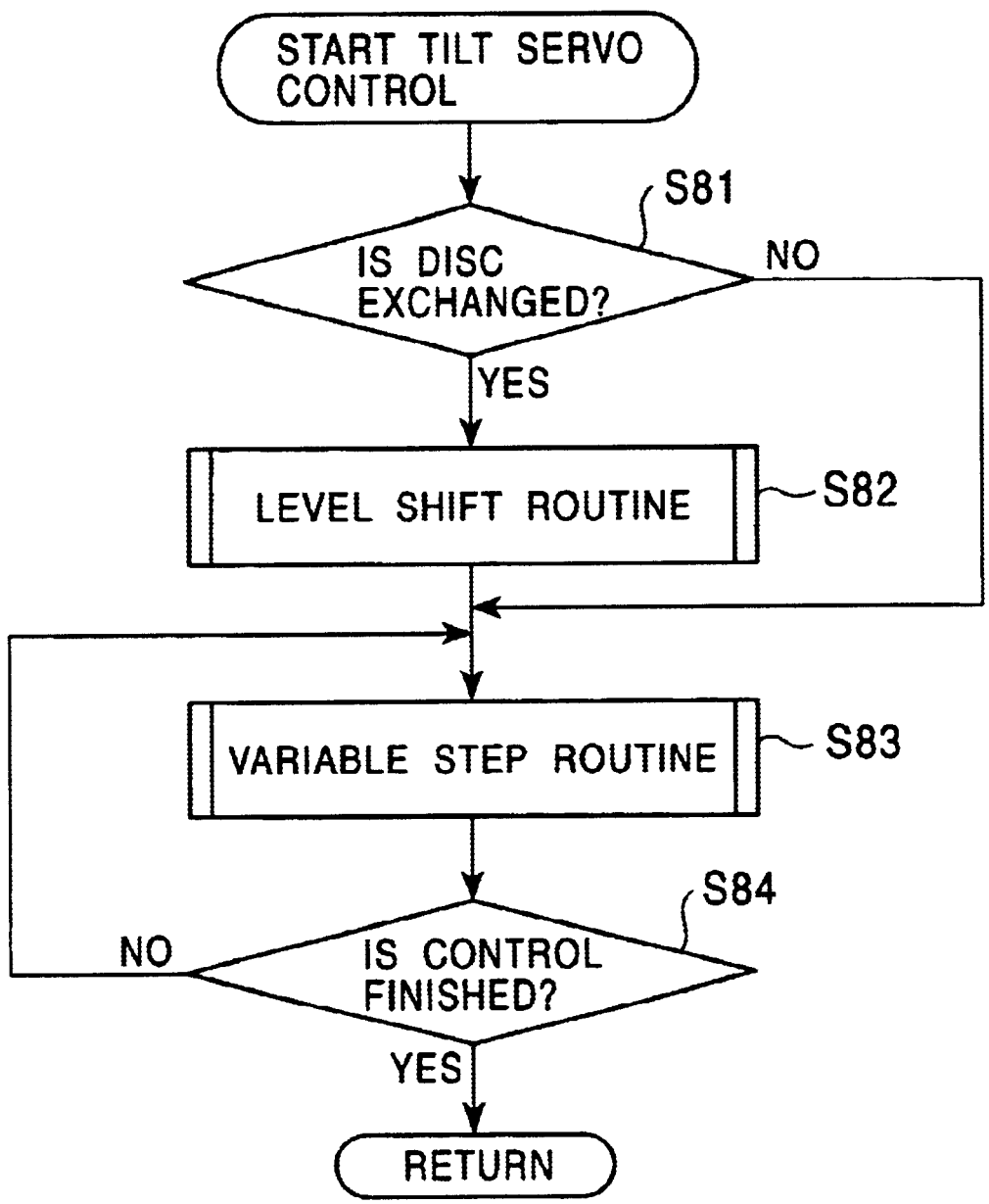
FIG. 13 is a flowchart showing a procedure for a tilt servo control using a level shift method according to the third embodiment of the present invention.

The operation shown in the flowcharts of FIGS. 12 and 13 is executed by an interrupting process by the system control unit 17, for example, during the recording or reproduction of the optical disc 1.

The operation of the level shift control will be described with reference to the flowchart of FIG. 12. First, initial set values which are used in this control routine are fetched (step S61). Subsequently, the count value (i) is initialized to "1" in order to average the output VR of the level shifting unit 22 (step S62) and VR(i) is read (step S63). When VR is read a predetermined number of times, for example, 8 times (step S64), an average value is obtained (step S65). Whether VR lies within a target voltage range (predetermined value A) or not is subsequently discriminated (step S66). If it lies within the target voltage range, control returns to the main routine. If it is out of the target voltage range, a level shift control output value (OUT) is obtained as OUT=OUT+VR/α (step S67). Whether the obtained value OUT exceeds a predetermined maximum value or not is discriminated (step S68). If it exceeds, a signal which indicates an error-stop is transmitted (step S74). Then, control returns to the main routine. If the value OUT does not exceed the predetermined maximum value, whether it is less than a predetermined minimum value or not is discriminated (step S69). If it is less than the predetermined minimum value, a signal which indicates the error-stop is transmitted (step S74) and control returns to the main routine. If the value OUT is not less than the predetermined minimum value, a PWM control signal corresponding to the value OUT is generated (step S70). A count value J which indicates the number of adjusting times is incremented by "1" (step S71). Whether the count value J exceeds a predetermined number of adjusting times or not is discriminated (step S72). If it exceeds, the signal which indicates the error-stop is transmitted (step S74) and control returns to the main routine. If the value J does not exceed the predetermined number of adjusting times, the apparatus waits for a predetermined time (step S73). After that, the processing is returned to step S62 and the level shifting procedure is repeated.

The tilt servo control in the embodiment will now be described with reference to the flowchart of FIG. 13. First, whether the disc has been exchanged or not is discriminated (step S81). If it was exchanged, a level shift control routine is called and the level shift is executed (step S82). In this instance, the RF amplitude signal of a dynamic range which is large enough is supplied to the level shifting unit 22. Subsequently, a variable step method routine is called and a tilt control using the variable step method is executed step S83). By supplying a parameter value corresponding to the dynamic range to this routine, a high precision tilt servo control is executed. Whether the control has been finished or not is discriminated (step S84). If the control is not finished, the variable step method is continued. If it was finished, control returns to the main routine.

As described above, in the embodiment, by using the RF amplitude signal having the dynamic range which is large enough and the level shifter for shifting the reference voltage to a controllable range, the high precision tilt servo apparatus which operates at a high speed is realized.

Fourth Embodiment

The fourth embodiment of the present invention will now be described hereinbelow. A configuration of a tilt servo apparatus of the embodiment is similar to that of the first embodiment.

Figure 14:
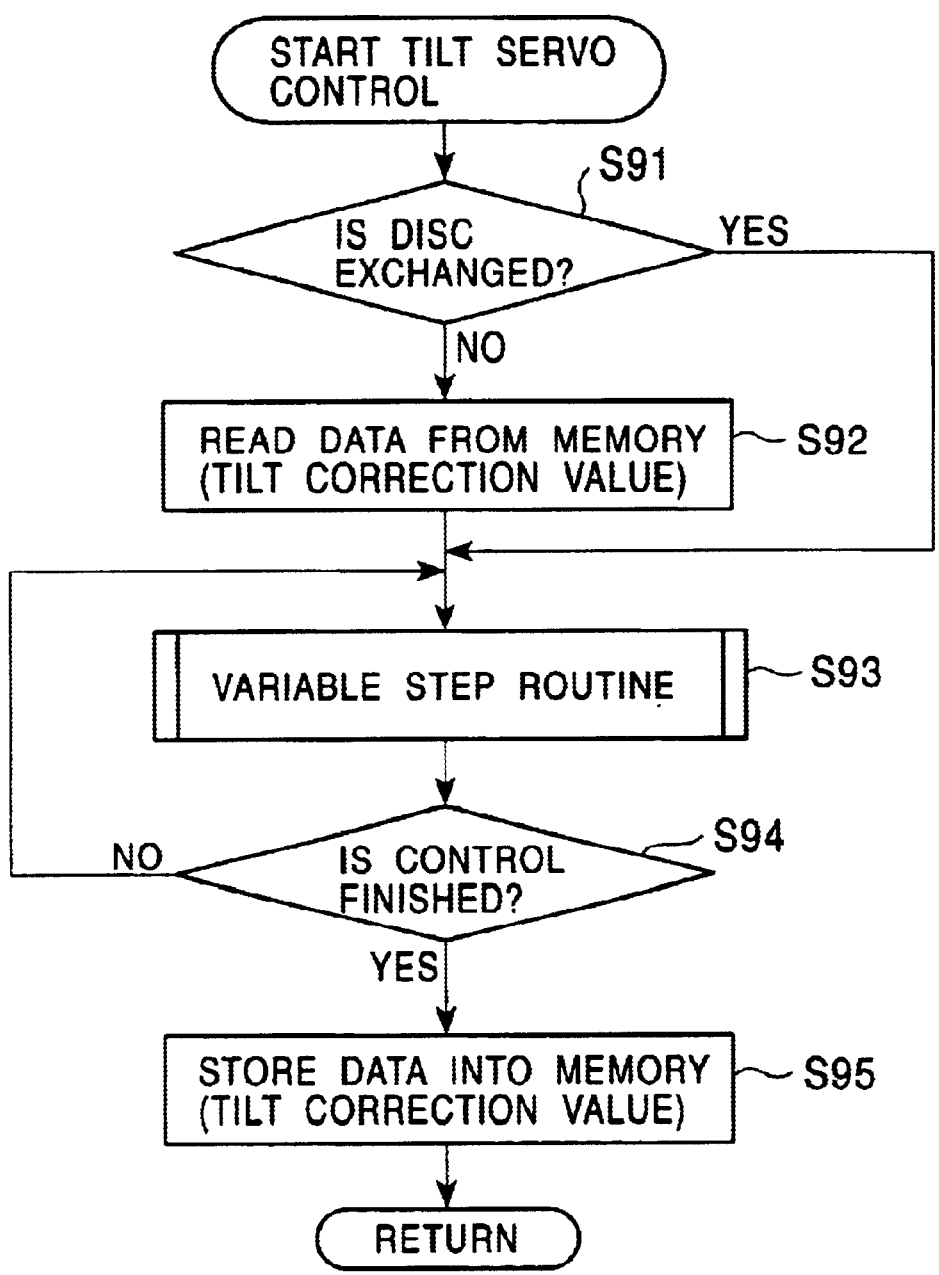
FIG. 14 is a flowchart showing a procedure for a tilt servo control according to the fourth embodiment of the present invention.

A tilt servo control in the fourth embodiment will now be described with reference to a flowchart of FIG. 14. The operation shown in the flowchart of FIG. 14 is executed under the control of the system control unit 17. First, whether the disc has been exchanged or not is discriminated (step S91). If it is not exchanged, data of a previous tilt correction value is read out from the memory (step S92). If the disc was exchanged, step S93 follows. Subsequently, the variable step method routine is called and a tilt control using the variable step method is executed (step S93). Whether the control has been finished or not is discriminated step S94). If it is not finished, the variable step method is continued. If it was finished, the tilt correction value in this instance is stored in the memory (step S95) and ontrol returns to the main routine.

As described above, according to the embodiment, the optimum tilt correction value is stored and the stored value is read out and used at the time of the next tilt servo control, so that the time that is required for tilt correction can be remarkably reduced.

As described in detail above, according to the present invention, a tilt servo apparatus which operates at a high speed and with high precision irrespective of the magnitude of the tilt error or the change in environmental temperature can be realized.

The tilt servo controls shown in the above embodiments can be properly combined and used.

As will be obviously understood from the above description, according to the present invention, it is possible to realize a tilt servo apparatus which can correct a tilt error at a high speed and with high precision irrespective of the magnitude of the tilt error even if the response speed of the liquid crystal device decreases due to a change in environmental temperature.

The invention has been described with reference to the preferred embodiments thereof. It should be understood by those skilled in the art that a variety of alternations and modifications may be made from the embodiments described above. It is therefore contemplated that the appended claims encompass all such alternations and modifications.

What is claimed is:

1. A tilt servo apparatus comprising:
   photodetecting means for detecting a reflected light beam of a laser beam irradiated to an optical recording medium,
   tilt error correcting means for correcting a tilt error occurring due to a tilt angle which is formed between an optical axis of said laser beam and a direction normal to said optical recording medium at said laser beam irradiating position,
   control means for controlling said tilt error correcting means on the basis of a detection signal intensity of said photodetecting means,
   correction value changing means for changing a correction value of said tilt error correcting means by a first correction width;
   comparing means for comparing an amount of change of said detection signal intensity when said correction value is changed by said first correction width with a predetermined amount of change; and
   correction width changing means for changing said first correction width on the basis of the comparison result of said comparing means.

2. An apparatus according to claim 1, wherein if it is determined by said comparing means that said amount of change of said detection signal intensity is smaller than said predetermined amount of change, said correction width changing means changes said first correction width to a second correction width smaller than said first correction width.

3. An apparatus according to claim 1, wherein if it is determined by said comparing means that said amount of change of said detection signal intensity is larger than said predetermined amount of change, said correction width changing means changes said first correction width to a third correction width larger than said first correction width.

4. An apparatus according to claim 1, wherein said comparing means also discriminates a reduction of said detection signal intensity when said correction value is changed, and when the reduction of said detection signal intensity is determined, said correction width changing means reverses an increasing/decreasing direction of said correction value and calculates the correction width.

5. An apparatus according to claim 1, wherein said tilt error correcting means is a liquid crystal device for aberration correction arranged on the optical axis of said laser beam, and the control signal of said control means is a driving signal of said liquid crystal device.

6. An apparatus according to claim 5, further comprising temperature detecting means for detecting a temperature of an environment where said liquid crystal device is arranged, wherein said correction width is determined on the basis of the detected environmental temperature.

7. An apparatus according to claim 1, further comprising storing means for storing the correction value in which said amount of change of said detection signal intensity is smaller than a predetermined threshold value as an optimum value of the tilt error correction, wherein said control means uses the stored optimum value as an initial value of the correction value of said tilt error correcting means.

8. An apparatus according to claim 1, further comprising level changing means for changing a level of said detection signal intensity so that said detection signal intensity does not exceed a predetermined upper limit value.

9. A tilt servo apparatus comprising:

photodetecting means for detecting a reflected light beam of a laser beam irradiated to an optical recording medium, tilt error correcting means for correcting a tilt error occurring due to a tilt angle which is formed between an optical axis of said laser beam and a direction normal to said optical recording medium at said laser beam irradiating position, control means for controlling said tilt error correcting means on the basis of a detection signal intensity of said photodetecting means, discriminating means for discriminating an increase/decrease and an amount of change of said detection signal intensity when a correction value of said tilt error correcting means is changed by a predetermined value;

calculating means for calculating a correction width on the basis of a discrimination result of said discriminating means; and determining means for determining a plurality of correction values which are different from one another by the calculated correction width, wherein said control means controls said tilt error correcting means so as to obtain a correction value in which said detection signal intensity becomes the maximum among said plurality of correction values.

10. A control method for a tilt servo apparatus having photodetecting means for detecting a reflected light beam of a laser beam irradiated to an optical recording medium, tilt error correcting means for correcting a tilt error occurring due to a tilt angle which is formed between an optical axis of said laser beam and a direction normal to said optical recording medium at said laser beam irradiating position, and control means for controlling said tilt error correcting means on the basis of a detection signal intensity of said photodetecting means, said method comprising the steps of:

changing a correction value of said tilt error correcting means by a first correction width;

comparing an amount of change of said detection signal intensity when said correction value is changed by said first correction width with a predetermined amount of change; and changing said first correction width on the basis of a comparison result of said comparing means.

11. A method according to claim 10, wherein the step of comparing further includes a step of discriminating a reduction of said detection signal intensity when said correction value is changed, and the step of changing said first correction width includes a step of reversing an increasing/decreasing direction of said correction value and calculating the correction width when the reduction of said detection signal intensity is determined.

12. A method according to claim 11, wherein said tilt error correcting means is a liquid crystal device for aberration correction arranged on the optical axis of said laser beam, and the control signal of said control means is a driving signal of said liquid crystal device.

13. A method according to claim 12, further comprising the steps of:

detecting a temperature of an environment where said liquid crystal device is arranged; and determining said first correction width on the basis of the detected environmental temperature.

14. A control method for a tilt servo apparatus having photodetecting means for detecting a reflected light beam of a laser beam irradiated to an optical recording medium, tilt error correcting means for correcting a tilt error occurring due to a tilt angle which is formed between an optical axis of said laser beam and a direction normal to said optical recording medium at said laser beam irradiating position, and control means for controlling said tilt error correcting means on the basis of a detection signal intensity of said photodetecting means, said method comprising the steps of:

discriminating an increase/decrease and an amount of change of said detection signal intensity when a correction value of said tilt error correcting means is changed by a predetermined value;

calculating a correction width on the basis of a discrimination result of the step of discriminating;

determining a plurality of correction values which are different from one another by the calculated correction width; and controlling said tilt error correcting means to a correction value in which said detection signal intensity becomes the maximum among said plurality of correction values.

15. A tilt servo apparatus comprising:

a photodetector which detects a reflected light beam of a laser beam irradiated to an optical recording medium;

a tilt error correcting portion which corrects a tilt error occurring due to a tilt angle which is formed between an optical axis of said laser beam and a direction normal to said optical recording medium at said laser beam irradiating position;

a controller which controls said tilt error correcting portion on the basis of a detection signal intensity of said photodetector;

a correction value changing portion which changes a correction value of said tilt error correcting portion by a first correction width;

a comparator which compares an amount of change of said detection signal intensity when said correction value is changed by said first correction width with a predetermined amount of change; and a correction width changing portion for changing said first correction width on the basis of the comparison result of said comparator.

16. A tilt servo apparatus comprising:

a photodetector which detects a reflected light beam of a laser beam irradiated to an optical recording medium;

a tilt error correcting portion which corrects a tilt error occurring due to a tilt angle which is formed between an optical axis of said laser beam and a direction normal to said optical recording medium at said laser beam irradiating position;

a controller which controls said tilt error correcting portion on the basis of a detection signal intensity of said photodetector;

a discriminating portion which discriminates an increase/decrease and an amount of change of said detection signal intensity when a correction value of said tilt error correcting portion is changed by a predetermined value;

a calculator which calculates a correction width on the basis of a discrimination result of said discriminating portion; and a determining portion which determines a plurality of correction values which are different from one another by the calculated correction width, wherein said controller controls said tilt error correcting portion so as to obtain a correction value in which said detection signal intensity becomes the maximum among said plurality of correction values.

* * * * *